(12) United States Patent
Kobayashi et al.

(10) Patent No.: US 8,275,566 B2
(45) Date of Patent: Sep. 25, 2012

(54) MEASURING APPARATUS AND MEASURING METHOD

(75) Inventors: Kanato Kobayashi, Azumino (JP); Takeshi Tsukanaka, Matsumoto (JP)

(73) Assignee: T & D Corporation, Nagano (JP)

( * ) Notice: Subject to any disclaimer, the term of this patent is extended or adjusted under 35 U.S.C. 154(b) by 532 days.

(21) Appl. No.: 12/408,338

(22) Filed: Mar. 20, 2009

(65) Prior Publication Data

US 2010/0100351 A1    Apr. 22, 2010

(30) Foreign Application Priority Data

Oct. 22, 2008  (JP) ................. 2008-272195

(51) Int. Cl.
*G01K 15/00* (2006.01)
*G01K 3/00* (2006.01)
(52) U.S. Cl. ......................... 702/99; 374/102
(58) Field of Classification Search .............. 702/99, 702/81, 84, 127, 130–131, 182–183, 188–189; 374/1, 100–102, 107, 112, 116, 132, 137, 374/163, 170, 186; 426/88
See application file for complete search history.

(56) References Cited

FOREIGN PATENT DOCUMENTS

| JP | 11-190665 A | 7/1999 |
| JP | 2005241593 A * | 9/2005 |

OTHER PUBLICATIONS

JP 2005-241593 A (English version).*

\* cited by examiner

*Primary Examiner* — Eliseo Ramos-Feliciano
*Assistant Examiner* — Toan M Le
(74) *Attorney, Agent, or Firm* — Buchanan Ingersoll & Rooney PC

(57) ABSTRACT

An apparatus including a recording switch for recording a temperature of an object; a judging unit that measures the temperature of the object using a sensor at intervals and judges whether a difference in temperatures measured at the intervals is within a range of a pre-set value; a first acquisition unit that records and/or outputs, when a switch-on of the recording switch is detected and the difference in temperatures is within the range of the pre-set value, information including a first temperature measured using the sensor and has become valid by the switch-on of the recording switch; and a second acquisition unit that records and/or outputs, when the switch-on is detected and the difference in temperatures is outside the range information including a second temperature measured using the sensor and becomes valid when the difference in temperatures falls within the range after the switch-on is detected.

10 Claims, 5 Drawing Sheets

MEASURING APPARATUS AND MEASURING METHOD

TECHNICAL FIELD

The present invention relates to an apparatus and method for measuring temperature.

BACKGROUND ART

Japanese Laid-Open Patent Publication No. H11-190665 discloses a temperature measuring apparatus and temperature measuring method that can easily and reliably manage and record a cooking temperature.

The measuring unit of the temperature measuring apparatus disclosed in Japanese Laid-Open Patent Publication No. H11-190665 includes a sensor signal inputting unit that is capable of receiving a temperature measurement signal detected by a sensor unit, a measuring unit capable of measuring a time period for which a set temperature is held, and a RAM that is capable of recording data, such as the hold time period or detected temperature, in addition to the measurement time. When a predetermined temperature or higher is held for a certain time period, the current temperature and the time are recorded in the RAM, which makes it possible to record whether temperature management was carried out properly. By using the measuring unit, it is possible to carry out temperature management that is required during cooking to prevent food poisoning and to collect history information for such management.

In recent years, a food hygiene management system called HACCP (Hazard Analysis and Critical Control Points) has been applied widely. When HACCP is applied, during the entire process from the arrival of ingredients to manufacturing and shipping, hazards are predicted in advance, critical control points (CCP) for avoiding such hazards (by prevention, eradication, or reduction to a tolerated level) are specified, and such points are continuously monitored and recorded. When such monitoring detects an abnormality, countermeasures are immediately assessed to solve the abnormality, and therefore it is possible from the outset to prevent defective products from being shipped. Accordingly, when monitoring and recording the temperature of foodstuffs, for example, it is necessary to measure temperature more accurately.

SUMMARY OF THE INVENTION

A first aspect of the present invention is an apparatus including a recording switch for recording a temperature of a target object. The measuring apparatus further includes: a judging unit that measures the temperature of the target object using a sensor at intervals of a first period and judges whether a difference in temperatures measured at the intervals is within a range of a pre-set value; a first acquisition unit that records and/or outputs, when a switch-on of the recording switch is detected and the difference in temperatures is within the range of the pre-set value, temperature information including a first temperature that is measured using the sensor and has become valid by the switch-on of the recording switch; and a second acquisition unit that records and/or outputs, when the switch-on of the recording switch is detected and the difference in temperatures is outside the range of the pre-set value, temperature information including a second temperature that is measured using the sensor and becomes valid when the difference in temperatures falls within the range of the pre-set value after the switch-on of the recording switch is detected.

This measured apparatus measures temperature according to a switch-on of the recording switch, and records a measured temperature only when a difference between temperatures (a temperature difference or a difference in temperature) produced by measuring the temperature of the target (measured) object at the intervals of a predetermined period is within a range of a predetermined (pre-set) value. If the temperature difference is within the range of the pre-set value when the recording switch is operated, the first acquisition unit records and/or outputs temperature information including a first temperature that was measured using the sensor and has become valid due to the recording switch having been operated. The temperature information may be recorded in a memory, storage, or the like of the measuring apparatus, and may be recorded in an external memory, storage, or the like by wireless communication or communication via cables or a computer network such as the Internet. As examples, the first temperature that has become valid due to the recording switch having been operated may be a temperature measured immediately after the switch-on of the recording switch was detected, a temperature that has already been obtained and was measured immediately before the switch-on of the recording switch was detected, or a temperature that was remeasured in response to the detection of the switch-on of the recording switch.

If the temperature difference is outside the range of the pre-set value when the recording switch is operated, the second acquisition unit records and/or outputs temperature information including the second temperature that was measured using the sensor and becomes valid when the difference in temperatures falls within the range of the pre-set value after the recording switch has been operated. According to this measuring apparatus, temperatures are not recorded and/or outputted when the temperature difference is outside the range of pre-set value. Using the apparatus, instead of accurately measuring the temperature itself or in addition to accurately measuring the temperature itself, it is possible to measure a temperature that accurately reflects a state relating to the target object that a temperature change for the object is within a predetermined range. Accordingly, the temperature included in the temperature information recorded and/or outputted by this apparatus can accurately reflect the state of the object (i.e., a steady state of the target object) and it is possible to record and/or output information (data) including a more accurate temperature that is suited to purposes such as monitoring and recording the temperature of a food product or the like.

In this apparatus, the first acquisition unit may record in a recording medium such as a memory and/or output (i.e., output on a display or output as data) the temperature information that includes, in addition to the first temperature, a measurement time of the first temperature and the second acquisition unit may record and/or output the temperature information that includes, in addition to the second temperature, a measurement time of the second temperature. The first temperature and the second temperature have the temperature difference within the range of a predetermined value and being stable with respect to time. Accordingly, temperatures before and after the measurement times should be the almost the same. Therefore, the apparatus can record and output the temperature information that is a highly accurate and reliable to the respective measurement times. This means that the relationship between the measured temperature and the measurement time included in the temperature information is stabilized and highly accurate. This kind of information is suited to monitoring and recording the temperature of a food product or the like.

It is also preferable for the second acquisition unit to cancel the switch-on of the recording switch if the difference in temperatures remains outside the range of the pre-set value for a predetermined period after the switch-on of the recording switch is detected. By such function of the second acquisition unit, the operator should operate the recording switch again to record the temperature and it makes the operator aware of a state relating to the temperature of the target object.

It is also preferable for the measuring apparatus to include a display (display unit). The display may display a temperature measured by the sensor. Also, it is preferable for the first acquisition unit to include a function that, when the recording switch has been operated, displays the first temperature on the display as a recorded temperature, and for the second acquisition unit to include a function that, when the recording switch has been operated, to display a message showing the apparatus is awaiting temperature convergence and thereafter display the second temperature on the display unit as a recorded temperature. By doing so, it is possible to make the operator aware of a state relating to the temperature of the target object.

The apparatus should preferably further include a communication unit including a function that transmits, when the temperature information has been obtained, the temperature information to an external host apparatus equipped with a recording medium. Here, it is possible to provide a portable and convenient apparatus that can easily display and/or record information in a host apparatus and is suited to managing the temperature of foodstuffs according to HACCP.

In addition, the apparatus should preferably include a guide unit that receives an instruction for a switch-on of the recording switch from the host apparatus via the communication unit and displays an instruction for operation of the recording switch. By doing so, it is possible to inform an operator (user), who is measuring the temperature and the like of the measured object using the measuring apparatus, of appropriate timing for measurement from a host apparatus.

A typical sensor of the apparatus is a rod type sensor that is capable of being inserted into the target object and measuring an internal temperature of the target object. The apparatus may be equipped with such sensor or may receive a measured temperature from a separate sensor either wirelessly or via a cable.

Another aspect of the present invention is a measuring system including: the apparatus that includes the communication function described above; and a host apparatus capable of communication with the measuring apparatus, wherein the host apparatus includes a recording medium that is capable of recording temperature information transferred from the measuring apparatus.

Another aspect of the present invention is a method of measuring the temperature of a measured object and includes steps of:

(1) measuring a target object using an apparatus with a recording switch for recording the temperature of the target object via a sensor at intervals of a first period and judging whether a difference in temperatures measured at the intervals is within a range of a pre-set value;

(2) recording and/or outputting temperature information, by switch-on of the recording switch, including a first temperature that is measured via the sensor and has become valid by the switch-on of the recording switch, if the difference in temperatures is within the range of the pre-set value when the apparatus detects the switch-on of the recording switch; and (3) recording and/or outputting temperature information, by the switch-on of the recording switch and if the difference in temperatures is outside the range of the pre-set value when the apparatus detects the switch-on of the recording switch, including a second temperature that is measured via the sensor and becomes valid when the difference in temperatures falls within the range of the pre-set value after the apparatus detects the switch-on of the recording switch.

According to this method of measuring, it is possible to measure a highly accurate temperature where a state relating to the temperature of the target object is stabilized and there are little fluctuations over time.

The temperature information should preferably include a measurement time. Since the temperature included in the temperature information has little fluctuations over time, it is possible to obtain temperature information that is not sensitive to the measurement time and where the relationship between measurement time and temperature may be highly accurate.

The method should preferably further include a step of canceling the switch-on of the recording switch by the apparatus if the difference in temperatures remains outside the range of the pre-set value for a predetermined period.

In this method, it is preferable that the step (2) described above includes displaying, when the apparatus detects the switch-on of the recording switch, the first temperature on a display as a recorded temperature, and that the step (3) includes displaying, when apparatus detects the switch-on of recording switch, to display on the display a message showing that temperature convergence is awaited and thereafter display the second temperature on the display as a recorded temperature. By doing so, the operator can be made aware of a state relating to the temperature of the measured object.

DETAILED DESCRIPTION OF THE INVENTION

Figure 1:
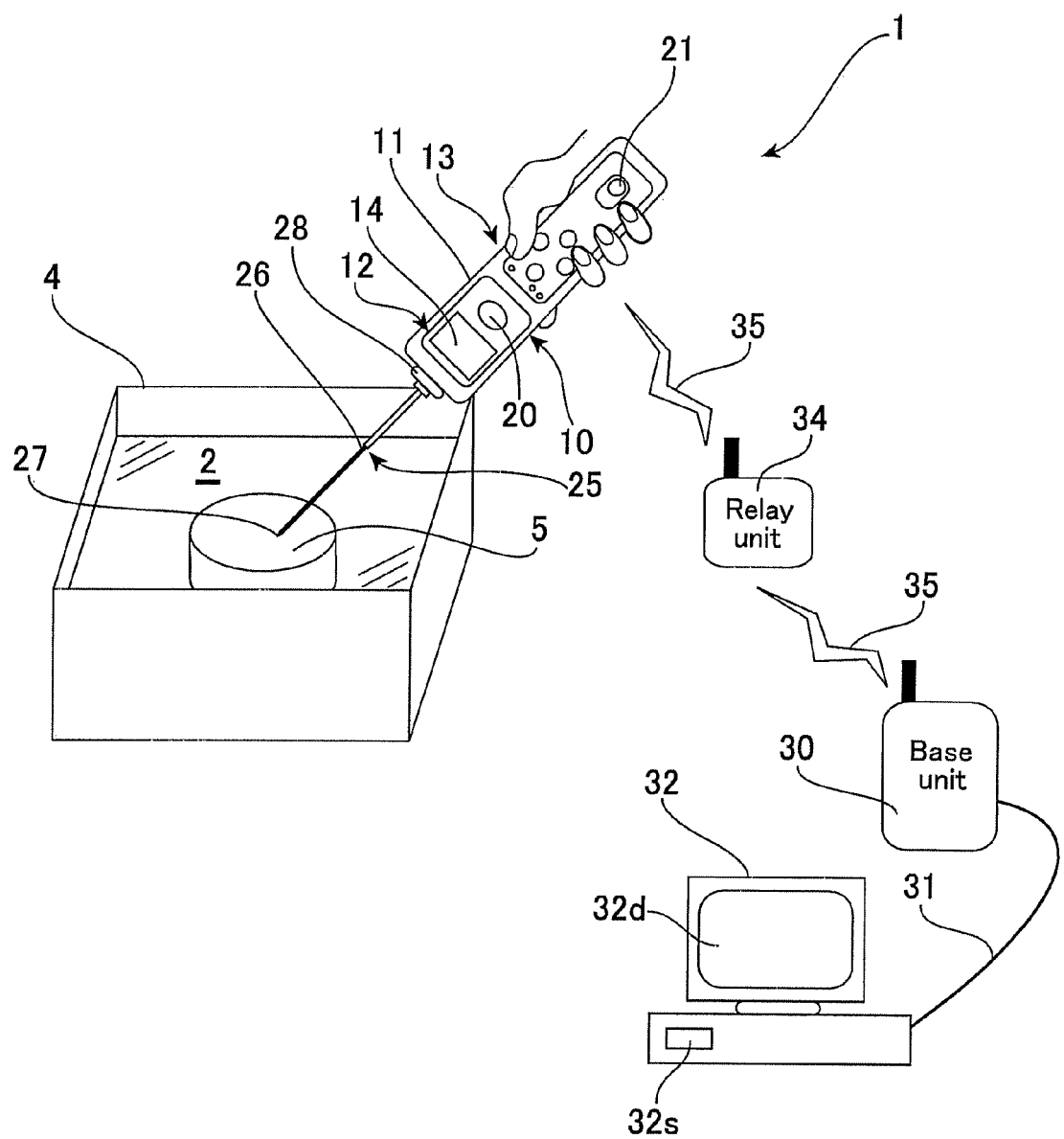
FIG. 1 is a diagram showing the typical configuration of a measuring system including a measuring apparatus.

The invention will now be described in detail with reference to the drawings. FIG. 1 shows the general configuration of a measuring system including a measuring apparatus. The measuring system 1 includes a measuring apparatus 10 for measuring the temperature of a foodstuff being cooked as a target (measured object), for example, a croquette 5 in a fryer 4, and a personal computer (PC) 32 that is a host apparatus for recording the temperatures measured by the measuring apparatus 10. The measuring apparatus 10 and the PC 32 can communicate via wireless signals 35 and in this example, the measuring apparatus 10 and the PC 32 are capable of communicating via a base unit 30 that is connected to the PC 32 by a cable 31 and a relay unit 34 that is connected via the wireless signals 35. The PC 32 includes a display 32d for displaying information and storage 32s for storing information, such as a hard disk drive. Accordingly, it is possible to set up the measuring apparatus 10 and the PC 32 at remote locations, such as a cooking place (kitchen) and an office, and manage temperatures measured by the measuring apparatus 10 using the PC 32. Information including measured temperatures from the apparatus 10 can also be stored in the PC 32.

Figure 2:
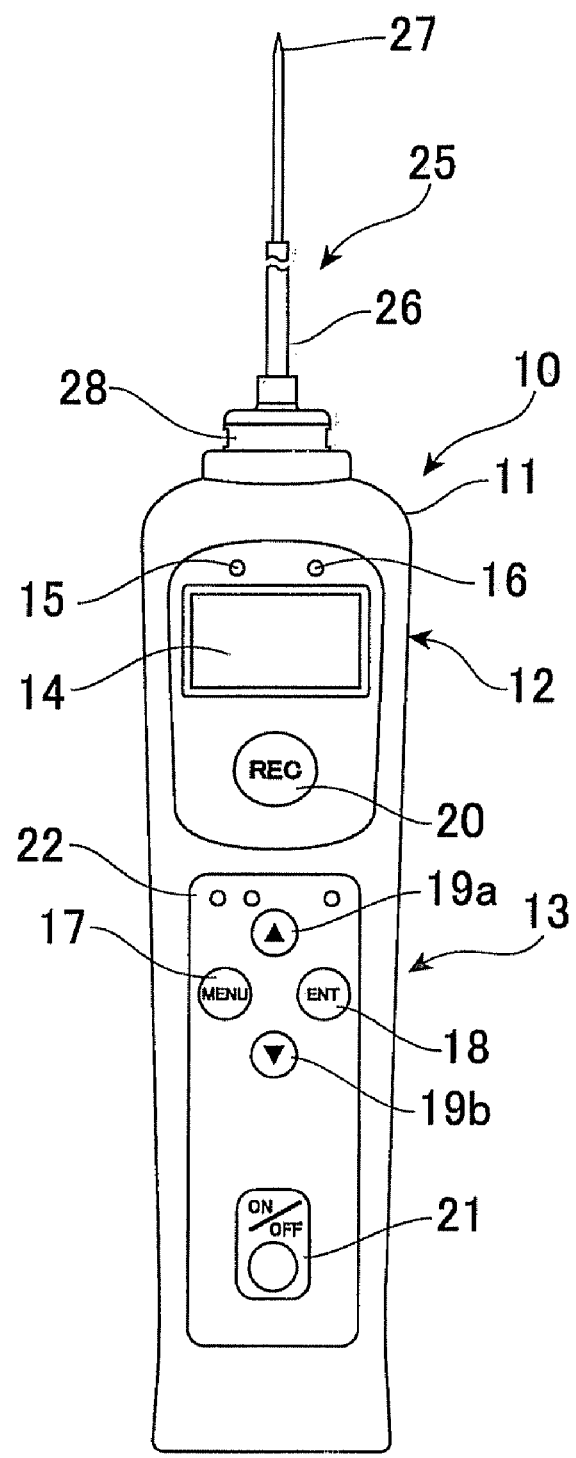
FIG. 2 is a diagram showing the exterior view of the measuring apparatus.

As shown in FIGS. 1 and 2, the measuring apparatus 10 is a "handy-type" wireless temperature measuring unit of a compact size that can be carried by hand and is capable of recording the temperature and measurement time via a one-push operation. The measuring apparatus 10 includes a slender housing 11 of a suitable size for holding in the hand and a sensor unit 25 that is attached to an upper end of the housing 11. The sensor unit 25 includes a stainless pipe (rod) 26 and a thermistor 27 attached to the front tip of the rod 26, and is capable of being detachably attached to the housing 11 by a screw-type connector 28. As shown in FIG. 1, the measuring apparatus 10 of the illustrated type is capable of measuring the temperature of the croquette (target object) 5 that is being cooked in oil 2, for example, by inserting the front end 27 of the rod type sensor unit 25 that is integrated with the measuring apparatus 10 into the measured object 5. Although not shown, it is also possible to use a separate sensor unit that is attached to the housing 11 during use, and in such case, the temperature of the measured object 5 can be measured by holding (gripping) the separate sensor unit (a "handy-type" sensor unit) instead of the housing 11.

The housing 11 of the measuring apparatus 10 is broadly divided into a lower part that forms an operation unit 13 which is easy to operate when the housing 11 is held by hand and an upper part that forms a display unit 12. A liquid crystal display 14 that displays a variety of information, an LED 15 that displays an alarm such as when a tolerated range for the measured temperature is exceeded, and an LED 16 that is lit when a temperature has been recorded are provided on the display unit 12. The display 14 displays information such as a temperature being measured, a temperature that has been recorded, a judgment result for conditions relating to the temperature being measured, a measurement time, a user name or identification, and a name or identification of the target object.

A recording switch 20 for designating the recording of temperature is provided on the operation unit 13. In addition, a menu button 17 for using the display 14 to set various conditions for measuring temperature with the measuring apparatus 10, a setting button 18, and cursor keys 19a and 19b for moving the display content up and down are provided on the operation unit 13. The operation unit 13 further includes a power switch 21 for switching the power on and off. An infra-red interface 22 that is capable of infra-red communication with the base unit 30 is also provided on the housing 11 so that initial settings for carrying out communication with the PC 32, such as identification information of the measuring apparatus 10, can be communicated and data can be exchanged via infra-red communication.

Figure 3:
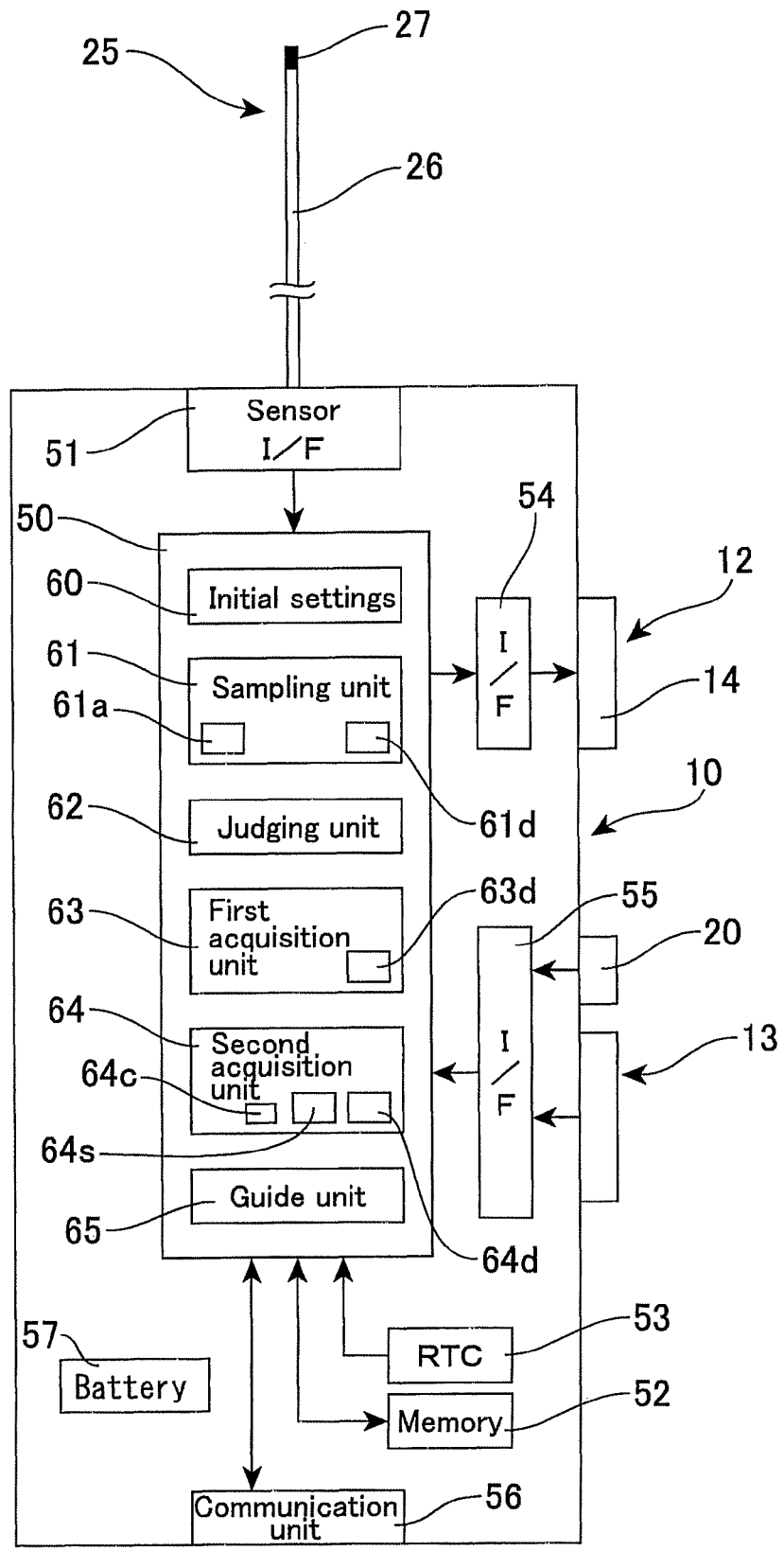
FIG. 3 is a block diagram showing the functions of the measuring apparatus.

FIG. 3 is a block diagram showing the major functions of the measuring apparatus 10. The measuring apparatus 10 includes a sensor interface 51 for regularly measuring temperature using the thermistor 27 of the integral sensor unit 25 or the thermistor of a handy-type unit, a control unit 50 that is realized by a microcomputer, a CPU, or the like, a memory 52, a time measuring unit (real time counting unit, clock unit) 53, a display interface 54 for controlling the display unit 12, an operation interface 55 for controlling the switches on the operation unit 13, and a wireless communication unit 56. A battery 57 is also provided in the measuring apparatus 10 so that the measuring apparatus 10 can be used as a portable hand-held device.

The control unit 50 includes an initial settings function (function unit) 60 for setting the measurement conditions via the operation unit 13 and/or the infra-red interface 22, a sampling function 61 for measuring the temperature of the measured object 5 using the thermistor 27 of the sensor unit 25 at intervals of a first time period, and a judging function 62 that judges whether a temperature difference Td between temperatures measured at intervals of the first time period is within a range of a value set in advance (pre-set value).

In this example, the sampling function 61 measures temperature using the thermistor (the temperature sensor) 27, at intervals of 0.5 seconds. The sampling interval is not limited to 0.5 seconds, and may be any time period where a change in temperature can be measured for the object 5, such as 1 second, 0.1 seconds, or the like. The sampling function 61 measures time constants for the thermistor 27 and three standard resistors (not shown), and converts a ratio thereof to a temperature measurement value t by referring to a temperature correlation table set in advance. The standard resistances are selected according to the measured temperature range (temperature zone). The sampling function 61 further includes a temperature adjusting function 61a. This function converts the temperature measurement value t described above to a measured temperature T according to the conversion formula given below.

$$T=at+b \quad (1)$$

Here, the gradient "a" and the intercept "b" are set by the initial settings function 60. By setting the gradient "a" at "1" and the intercept "b" at "0", the temperature measurement value t is outputted as the measured temperature T. The temperature adjusting function 61a can be used to correct any measurement error in the temperature measurement value t. For example, it is possible to use an offset and a span to make adjustments via software.

The judging unit (functional unit) 62 compares a change (i.e., temperature difference) Td in the measured temperature T with a pre-set change in temperature (pre-set value) Ts, and judges whether the change Td in the measured temperature T is within the range of the pre-set value Ts. The value Ts can be set by the initial settings function 60. In this example, the value Ts can be set at a value from 0.1° C./second to 25.0° C./second. When sampling is carried out at intervals of 0.5 seconds, it is judged from the difference (i.e., temperature change) between three measured temperatures T that have been sampled whether the temperature change is within a predetermined range. Note that it is possible to use an initial setting of 0.0° C. as the set value Ts. In such case, the judging function 62 does not judge whether the change Td in the measured temperature T is within the range of the set value Ts or alternatively the judging function 62 is bypassed and it is concluded that the value is always within the range. Accordingly, whenever the recording switch 20 is pushed (switch-on), a valid temperature T at that time is recorded without waiting for convergence (closure) in the change in temperature.

The control unit 50 includes a first acquisition unit (functional unit) 63 and a second acquisition unit (functional unit) 64 for recording temperature caused by switch-on of the recording switch 20. When the recording switch 20 is on (pushed on), if the difference (temperature change) Td for the measured temperature T is within the range of the value (pre-set value) Ts that has been set, the first acquisition unit 63 records and/or outputs temperature information Tdata including a first temperature Ti that is a temperature that was measured by the thermistor 27 and is valid due to the switch-on (push on) of the recording switch 20. The temperature change Td is constantly monitored by the judging unit 62. Accordingly, the first acquisition unit 63 may know judgment of the judging unit 62 at a point when a switch-on of the recording switch 20 was detected (confirmed) by the control unit 50, based on the temperature change Td immediately before the switch-on of the recording switch 20 and the value Td is within the range of the set value Ts. It is also possible to know the judgment of the judging function 62 based on the temperature change Td immediately after the detection of the switch-on of the recording switch 20 in the control unit 50, the temperature change Td being obtained from a temperature T measured immediately after the switch-on of the recording switch 20, and the value Td is within the range of the set value Ts.

As the first temperature T1 included in the temperature information Tdata, it is possible to use a measured temperature T measured (sampled) immediately before or immediately after the switch-on of the recording switch 20 was confirmed by the control unit 50. If the predetermined sampling interval is long, a separate temperature measurement using the sampling function 61 can be performed when the switch-on of the recording switch 20 has been detected and use the measured temperature T at that time as the first temperature T1.

The first acquisition unit 63 also obtains, from the time measuring unit 53, the time at which the first temperature T1 was obtained as the measurement time GT, generates the temperature data Tdata including the first temperature T1 and the measurement time GT, and records the temperature data Tdata in the memory 52. In addition, the wireless communication unit 56 is used to transfer (output) the temperature data Tdata to the PC 32 that is a host apparatus. The transmission of temperature data Tdata to the PC 32 may be carried out every time the temperature data Tdata is generated, or by carrying out communication at appropriate intervals, it is possible to transfer a plurality of temperature information Tdata that have been recorded in the memory 52 of the measuring apparatus 10 during such interval to the PC 32. It is also possible for the measuring apparatus 10 to transmit the temperature data Tdata recorded in the memory 52 to the PC 32 in response to a request (polling) from the PC 32. Aside from the measured temperature and the measurement time, the temperature information Tdata can include information set in advance in the measuring apparatus 10, for example, information on the measured object 5, the measurer (user), or on an abnormality if the measured temperature T is abnormal.

When the recording switch 20 has been pushed on (switched on), if the difference (i.e., temperature change) Td for the temperatures T that have been measured is outside the range of the pre-set value Ts, the second acquisition unit 64 records and/or outputs temperature information Tdata including a second temperature T2 that is measured using the sensor 27 and becomes valid when the difference in temperature Td falls within the range of the pre-set value Ts following the detection of the switch-on of the recording switch 20. As described for the first acquisition unit 63, the temperature change Td is constantly monitored by the judging function 62. If, in the judging function 62 at the time when the control unit 50 has confirmed the switch-on of the recording switch 20, the difference Td is outside the range of the set value Ts, the second acquisition unit 64 waits for the measured temperatures to converge without generating the temperature information Tdata. After this, if, by the judging function 62, the difference Td obtained from the sampled temperatures T falls within the range of the set value Ts, the temperature T sampled at such time or the measured temperature T sampled immediately afterward is be used as the second temperature T2.

The second acquisition unit 64 also obtains, from the time measuring unit 53, the time when the second temperature T2 was obtained as the measurement time GT, generates temperature information Tdata including the second temperature T2 and the measurement time GT, and records the temperature information Tdata in the memory 52. In addition, the temperature information Tdata is transferred by the wireless communication unit 56 to the PC 32 that is a host apparatus. The transmission of the temperature information Tdata to the PC 32 is the same as described for the first acquisition unit 63 described above, and the temperature information Tdata may include the other information described above.

In addition, since the second acquisition unit 64 waits for convergence (closure) of the measured temperatures after the switching-on of the recording switch 20 is detected, the second acquisition unit 64 includes a function 64d for displaying an indication that the device is awaiting temperature convergence on the display 14. When the second temperature T2 is obtained after the waiting for convergence and the waiting has been released by the judging function 62, the display function 64d displays the second temperature T2 as the recorded temperature. The display function 64d is not limited to displaying the second temperature T2 and may display any of the information included in the temperature information Tdata on the display 14 together with the second temperature T2. In addition the second acquisition unit 64 may include a transfer function 64s for transferring a message showing that the apparatus 10 is now on awaiting temperature convergence to the PC 32 by the wireless communication.

The second acquisition unit 64 also includes a canceling function 64c that cancels the switch-on of the recording switch 20 if the temperature difference Td is outside the range of the set value Ts and when a predetermined period (the convergence wait time) WT, for example 15 seconds, is passed after the detection of the switch-on of the recording switch 20. After the convergence wait time WT has passed, the canceling function 64c deletes the displayed message of awaiting temperature convergence by the display function 64d and has known the user that the switched-on of the recording switch 20 has been cancelled. The transfer function 64s transfers a message that the wait for convergence has been cancelled to the PC 32.

The first acquisition unit 63 also includes a function 63d that displays the first temperature T1 on the display 14 as a recorded temperature when the switch-on of the recording switch 20 has been detected. In addition, the sampling function 61 includes a display function 61d for displaying the sampled measured temperature T on the display 14. Display by the display function 63d of the first acquisition unit 63 and the display function 64d of the second acquisition unit 64 is prioritized, so that when the temperature information Tdata is generated, information included in the Tdata is displayed on the display 14 for a predetermined period, such as a period of between several seconds and several tens of seconds. After this, the display 14 displays the sampled temperature T according to the display function 61d.

The measuring apparatus 10 also includes a guide function 65 that produces a display for instructing the user to operate the recording switch 20 on the display 14. On receiving an instruction about an operation of the recording switch 20 from the PC 32 via the wireless communication unit 56, the guide function 65 displays an instruction to the user to push on the recording switch 20 on the display 14. When the manufacturing process of the target object 5, for example, a cooking process for a foodstuff, is managed using the PC 32, the operator (user) of the measuring apparatus 10 is instructed to measure the temperature at respective stages or events during the cooking, and by obtaining the measured temperature, it is possible to record and manage the temperature at predetermined stages during cooking.

Figure 4:
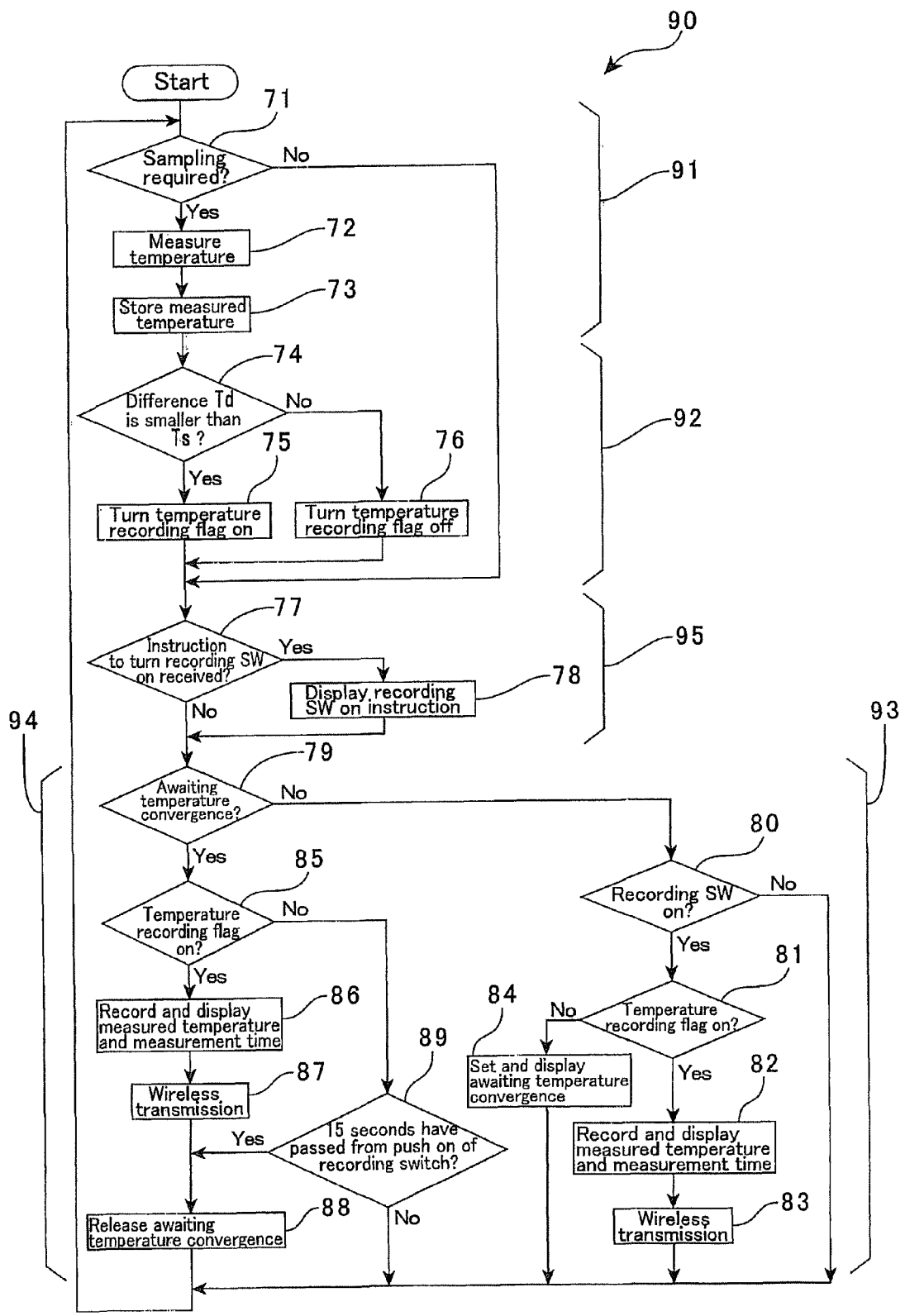
FIG. 4 is a flowchart showing the operation of the measuring apparatus shown in FIG. 3.

FIG. 4 is a flowchart showing an overview of the measurement using the apparatus 10. A measurement method (measurement process) 90 with the measuring apparatus 10 includes a process (step) 91 where the sampling function 61 measures the temperature T of the target object 5 at intervals of the first time period and a step 92 where the judging function 62 judges whether the difference Td between the temperatures measured at intervals of the first time period is within the range of the value Ts set in advance. The method 90 further includes a step 93 where, by the first acquisition unit 63, when the recording switch 20 has been switched on and the difference Td in temperatures T is within the range of the pre-set value Ts, the temperature information Tdata including the temperature T measured by the thermistor 27 is output and/or recorded. The method 90 further includes a step 94 where, by the second acquisition unit 64, when the recording switch 20 has been switched on and the difference Td in temperatures T is outside the range of the set value Ts, waiting for temperatures convergent is started, then, when the temperature difference Td falls within the range of the set value Ts, the temperature information Tdata including a temperature T is recorded and the temperature information Tdata is displayed on the display 14, and/or the temperature information Tdata via the wireless communication unit 56. The measurement method 90 also includes a step 95 where the guide function 65 displays an instruction of pushing of the recording switch 20.

In more detail, first in step 71, the sampling unit 61 judges whether the timing for carrying out sampling has been reached, obtains the measured temperature T at intervals of a predetermined time period (sampling interval) such as 0.5 seconds in step 72, and stores the measured temperature T in the memory 52 in step 73.

Next, in step 74, the judging unit 62 judges whether the temperature change (difference) Td is smaller than the pre-set value Ts that is set in advance. If the difference Td is within the range of the pre-set value Ts, the judging unit 62 judges that the measured temperatures T have converged and in step 75 a temperature recording flag (temperature recording permission flag) that is a judgment is set at ON. On the other hand, if the difference Td is outside the range of the pre-set value Ts, the judging unit 62 judges that the measured temperatures T have not converged and in step 76 the temperature recording flag is set at OFF. In step 74, the absolute value of the difference Td is compared to the set value Ts and if the difference Td is within the range regardless of whether the difference Td is positive or negative, it is judged that the measured temperatures have converged. Accordingly, the measuring apparatus 10 can be applied to both a heating process and a cooling process, and can also be applied to processes where a change in temperature is susceptible to overshooting and undershooting.

In addition, on receiving an operation instruction for the recording switch 20 in step 77, the guide unit 65 instructs the user to push the recording switch 20 via the display 14 in step 78.

Next, in step 79, the first acquisition unit 63 and the second acquisition unit 64 judge whether the status is awaiting temperature convergence or not. As described below, in the state of "awaiting temperature convergence", the switch-on of the recording switch 20 has been confirmed and the out of convergence of the measured temperatures has also been confirmed. When the state is awaiting temperature convergence, in step 85, the second acquisition unit 64 checks the temperature recording flag. On the other hand, if the state is not awaiting temperature convergence, the first acquisition unit 63 checks the state of the recording switch 20 in step 80.

If the first acquisition unit 63 judges, in step 80, that the recording switch 20 has been pushed, the first acquisition unit 63 checks the temperature recording flag in step 81. If the temperature recording flag is ON, in step 82 the first acquisition unit 63 displays the measured temperature T (the first temperature T1) and the measurement time GT obtained on the display 14. In addition, in step 83, the temperature information Tdata including the first temperature T1 is transmitted to the PC 32. In step 81, if the temperature recording flag is OFF, state of awaiting temperature convergence is set in step 84. The display function 64d of the second acquisition function 64 displays a message of awaiting temperature convergence on the display 14.

If the state is awaiting temperature convergence, the second acquisition unit 64 checks the temperature recording flag in step 85. During the awaiting temperature convergence state, if the temperature recording flag is turned ON (due to a measured temperature T that is newly sampled after the recording switch 20 has been pushed), the measured temperature T that is the second temperature, obtained at that time and the measurement time GT are displayed on the display 14 in step 86. In step 87, the temperature information Tdata including the second temperature T2 is transmitted to the PC 32. After this, in step 88 the awaiting temperature convergence state is released.

When the temperature recording flag has not been turned ON by a newly sampled measured temperature T, in step 85, a predetermined period (the convergence wait time) WT is checked whether the waiting time WT has elapsed from the switch-on of the recording switch 20. When the waiting time WT is within a pre-set value, for example 15 seconds, the processing returns to step 71 without canceling the awaiting temperature convergence state, the next sampling of temperature is carried out, and the awaiting temperature convergence state is maintained. On the other hand, when the convergence wait time WT exceeds the pre-set value, in step 88 the awaiting temperature convergence state is released and the switch-on of the recording switch 20 is cancelled.

Figure 5:
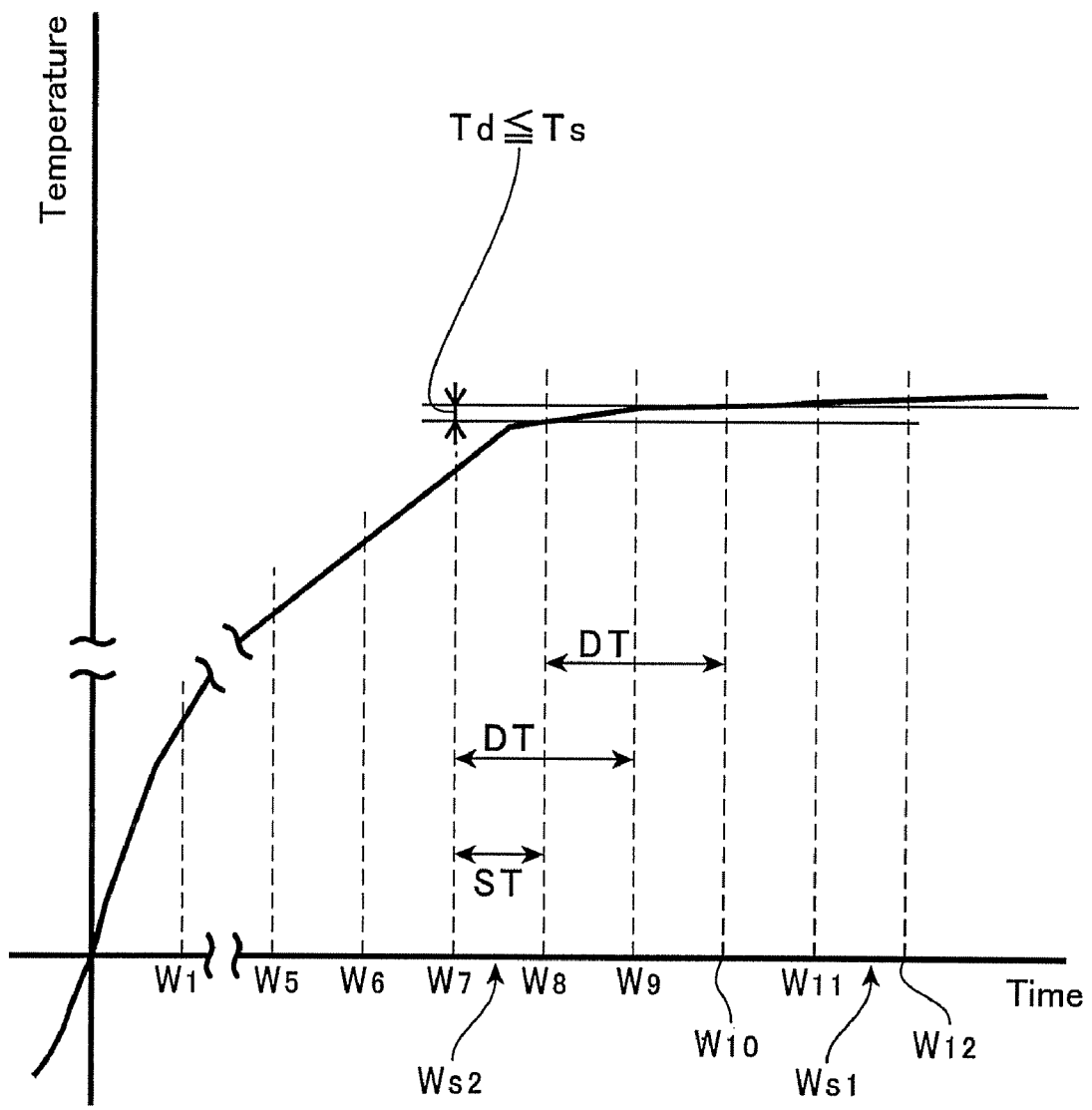
FIG. 5 is a graph showing one example where the measuring apparatus shown in FIG. 3 measures and records temperature.

FIG. 5 shows how temperature is measured and recorded by the measuring apparatus 10 during a procedure where the temperature of the object 5 is raised by cooking or the like. The measuring apparatus 10 samples the temperature at the sampling interval ST, for example, every 0.5 seconds, and carries out of judgment of the change (difference) Td in temperature at judgment intervals DT, for example, every 1.0 seconds. As a result, assume that the difference Td becomes within the set value Ts at the time W10.

If the recording switch 20 is pushed at the time Ws1 following the time W10, since the difference Td is within the set value Ts, the temperature T sampled before or after the time Ws1, that is, sampled at the time W11 or the time W12 is recorded by the first acquisition unit 63 as the first temperature T1, and the time at which the first temperature T1 was sampled, that is, the time W11 or the time W12 is recorded as the measurement time GT.

Conversely, if the recording switch 20 is pushed at the time Ws2 that is before the time W10, since the difference Td is outside the set value Ts, the message of awaiting temperature convergence is displayed on the display 14. After this, the temperature T sampled at the time W10 is recorded as the second temperature T2 and the time W10 is recorded as the measurement time GT. Alternatively, the temperature T sampled at the time W11 in the next sampling cycle may be recorded as the second temperature T2 and the time W11 may be recorded as the measurement time GT.

Using the measuring apparatus 10, the temperature can be recorded therein and displayed thereon by a simple one-push of the recording switch 20. In addition, by the simple one-push of the recording switch 20, it is possible to display the measured temperature with the measurement time and to record such temperature and time in an electronic memory. By such one-push, the measuring apparatus 10 only records the measured temperature T when the difference Td in the sampled temperatures T of the target 5 is within a range of a predetermined value Ts. The temperature itself is measured with favorable accuracy by the measuring apparatus 10. In addition, the temperatures recorded in the apparatus 10 are temperatures where the temperature change Td is within a predetermined range, and therefore the recorded temperatures will hardly fluctuate with respect to the measurement time GT. Accordingly, the temperatures T included in the temperature information Tdata recorded and/or outputted by the measuring apparatus 10 accurately reflect the state of the measured object 5 and are temperatures of the measured object 5 in a steady state. This means that the temperature of a food product or the like during processing is recorded not as a rising temperature where the temperature is changing but as a temperature that has been reached or a steady-state temperature, which makes it possible to monitor and record the processed state of the food product. Therefore, according to the measuring apparatus 10, it is possible to record information (data) including temperatures with increased accuracy and little fluctuation on the time axis in storage such as a memory, to display such information, and/or to output such information wirelessly or via a cable. That is, according to the measuring apparatus 10, it is possible to record a highly accurate measured temperature T for the measurement time GT with little changes in temperature before and after the measurement time GT.

The temperature information Tdata may be recorded in storage such as the memory 52 of the measuring apparatus 10, and is not limited to wireless communication, and the temperature information Tdata may be communicated via cables or a computer network such as the Internet and recorded externally in a memory, storage, or the like of the PC 32, for example. By providing a host apparatus and a communication-capable measuring apparatus 10, it is possible to provide a measuring system 1 that is suited to managing the temperature of foodstuffs according to HACCP, that uses a portable and convenient measuring apparatus 10, and can easily display and/or record information in a host apparatus such as a PC 32.

In addition, a measuring apparatus 10 that is capable of communication with a host apparatus can receive instructions, including instructions for operation of the recording switch 20, from the host apparatus via the communication unit 56. Accordingly, it is possible to provide a system 1 that is capable of reliably recording the state of predetermined events during an operation where respective events need to be managed according to HACCP or the like.

Note that although the sensor unit 25 that uses a thermistor as a sensor is used in the measuring apparatus 10 described above, it is also possible to use another temperature sensor such as a thermocouple. The rod-like sensor unit 25 is suited to being inserted into the measured object 5 and measuring the internal temperature of the target object 5. The sensor unit is not limited to a rod-like unit and may be a sensor unit such as a radiation thermometer that is capable of detecting temperature in a contactless manner or a sensor unit that can measure other environmental information such as humidity in addition to temperature and record such information together with the temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hand held apparatus comprising:
   a recording switch for recording a temperature of a target object;
   a judging unit that measures the temperature of the target object using a sensor at intervals of a first period and judges whether a difference in temperatures measured at the intervals is within a range of a pre-set value;
   a first acquisition unit that records and/or outputs, when a switch-on of the recording switch is detected and the difference in temperatures is within the range of the pre-set value, temperature information including a first temperature that is measured using the sensor and has become valid by the switch-on of the recording switch:
   a second acquisition unit that records and/or outputs, when the switch-on of the recording switch is detected and the difference in temperatures is outside the range of the pre-set value, temperature information including a second temperature that is measured using the sensor and has become valid when the difference in temperatures falls within the range of the pre-set value after the switch-on of the recording switch is detected; and
   a display,
   wherein the first acquisition unit displays, when the switch-on of the recording switch is detected, the first temperature on the display as a recorded temperature, and
   the second acquisition unit displays, when the switch-on of the recording switch is detected, a message showing the apparatus is awaiting temperature convergence and displays, when the second temperature is acquired, the second temperature on the display unit as a recorded temperature.

2. The apparatus according to claim 1,
   wherein the first acquisition unit records and/or outputs the temperature information that includes, in addition to the first temperature, a measured time of the first temperature, and
   the second acquisition unit records and/or outputs the temperature information that includes, in addition to the second temperature, a measured time of the second temperature.

3. The apparatus according to claim 1,
   wherein the second acquisition unit cancels, after the switch-on of the recording switch is detected, the switch-on of the recording switch if the difference in temperatures remains outside the range of the pre-set value for a predetermined period.

4. The apparatus according to claim 1, further comprising a communication unit that transmits, when the temperature information has been obtained, the temperature information to a host apparatus that is external and equipped with a recording medium.

5. The apparatus according to claim 4, further comprising a display and a guide unit that receives an instruction for a switch-on of the recording switch from the host apparatus via the communication unit and displays an instruction for operation of the recording switch on the display.

6. A measuring system comprising:
an apparatus according to claim 4; and
a host apparatus capable of communication with the apparatus,
wherein the host apparatus includes a recording medium that is capable of recording temperature information transferred from the measuring apparatus.

7. The apparatus according to claim 1, further comprising the sensor that is a rod type sensor for inserting the sensor into the target object for measuring an internal temperature of the target object.

8. A method of measuring temperature comprising:
measuring a target object using an apparatus with a recording switch for recording the temperature of the target object via a sensor at intervals of a first period and judging whether a difference in temperatures measured at the intervals is within a range of a pre-set value;
recording and/or outputting temperature information, by switch-on of the recording switch, including a first temperature that is measured via the sensor and has become valid by the switch-on of the recording switch, if the difference in temperatures is within the range of the pre-set value when the apparatus detects the switch-on of the recording switch; and
recording and/or outputting temperature information, by the switch-on of the recording switch and if the difference in temperatures is outside the range of the pre-set value when the apparatus detects the switch-on of the recording switch, including a second temperature that is measured via the sensor and has become valid when the difference in temperatures falls within the range of the pre-set value after the apparatus detects the switch-on of the recording switch,
wherein recording and/or outputting the temperature information including the first temperature includes displaying, when the apparatus detects the switch-on of the recording switch, the first temperature on a display as a recorded temperature, and
the recording and/or outputting the temperature information including the second temperature includes displaying, when the apparatus detects the switch-on of the recording switch, a message showing that temperature convergence is awaited on the display and displaying, when the second temperature is acquired, the second temperature on the display as a recorded temperature.

9. The method according to claim 8,
wherein the step of recording and/or outputting the temperature information including the first temperature records and/or outputs the temperature information that includes, in addition to the first temperature, a measurement time of the first temperature, and
the step of recording and/or outputting the temperature information including the second temperature records and/or outputs the temperature information that includes, in addition to the second temperature, a measurement time of the second temperature.

10. The method according to claim 8,
further comprising canceling the switch-on of the recording switch by the apparatus if the difference in temperatures remains outside the range of the pre-set value for a predetermined period.

* * * * *